United States Patent Office 3,430,206
Patented Feb. 25, 1969

3,430,206
CONTROL SYSTEMS FOR CONSTANT PROPORTION MIXTURES
Herbert Ernyei and Philippe Huguier, Paris, France, assignors to Societe Lignes Telegraphiques et Telephoniques, Paris, France, a joint-stock company of France
Filed Apr. 26, 1966, Ser. No. 545,338
Claims priority, application France, May 10, 1965, 16,400
U.S. Cl. 340—172.5  6 Claims
Int. Cl. G06f 9/00; H03k 13/32

ABSTRACT OF THE DISCLOSURE

The invention disclosed in the hereinafter specification comprises unique combinations of circuitry for introducing into a digital processing circuit of an automatic control system information regarding the measuring error as given by the calibration chart of the transducer used to measure the data to be processed. Specifically, logic circuit means are operated by a counter where the latter element receives the measured data including the error. Information is either added to or deleted from the processing circuits depending on the situation, and the logic circuit means are reset by an error memory, following correction; the error memory is programmed according to the error values given by the calibration chart for the transducer.

---

The present invention relates essentially to a better use of the precision that can be afforded by the numerical system for output control, which is the object of applicants' copending application Ser. No. 441,735. Said application describes a purely electronic and numerical regulating system. It is known that such systems afford precisions as high as can be desired, and in particular higher than that of the measuring devices incorporated in said systems. The flowmeters presently available in commerce have an error in the order of one percent, which defines the global error of the system. This precision may be insufficient. When the measuring devices are used for a direct measure, the calibration curve of errors in function of the output, supplied by the constructor or determined experimentally, permits the correction of errors in indication and ensures a much higher reading precision.

The object of the present invention is essentially to provide the control system of copending application Ser. No. 441,735 with the increased precision in reading the outputs and volumes which results from the compensation of the errors appearing on the calibration curve of the device used. The invention consists in introducing into the numerical processing circuit the information regarding the measuring error given by the calibration curve, whether this circuit is open (counting) or closed (regulating). The present invention is essentially characterized by the combination of the following elements, taken separately or totally:

(o) A transducer with a digital output.

(a) A local oscillator delivering impulses at a high frequency with respect to that of the digital signal from transducer (o) and feeding a compensation counter.

(b) A main counter receiving the digital signal from transducer (o) and actuating a logic circuit for introduction of the compensation.

(c) A digital memory circuit in which are recorded one or several error values of the transducer, in absolute value for measured values previously selected.

(d) A comparing circuit receiving the count shown by the compensation counter and the memory circuit according to (c) and actuating the logic circuit according to (b).

(e) A logic circuit which records the sign of said error values from transducer (o).

(f) A program generator synchronized by the transducer (o) and actuating the logic circuit according to (e) and the address of the memory stored value according to (c).

The improvements which are the objects of the present invention may be carried out in a very simple manner in the case of an output regulating system for in-line blending, of the type described in copending application Ser. No. 441,735. Since these systems operate on constant output, it is easy to detect the corresponding error on the calibration curve of the device used, which defines the value of the compensation signal. In case it is desired to pre-adjust the system for successive regulating of several processes associated with very different output values, one is led to effect corrections which may be very different, not only in absolute value, but also in sign changing. The circuits to carry out the invention are then more complex.

It is obvious that the improvements which are the objects of the present invention may be used not only in any numerical control systems, whatever the type of device used for measuring the magnitude being controlled, but also in any totaling and counting systems, whatever the type of apparatus used for measuring the magnitude being controlled, or more simply, being counted. The invention permits a rapid adaptation of the error compensating system, since it permits the compensation of errors of any sign and magnitude. Therefore, it does not decrease at all the polyvalence of the system to which it is applied.

The invention will be better understood with reference to the following description and attached drawings given as an illustration, non-limiting, of the compensation circuits according to the invention, in which.

Figure 1:
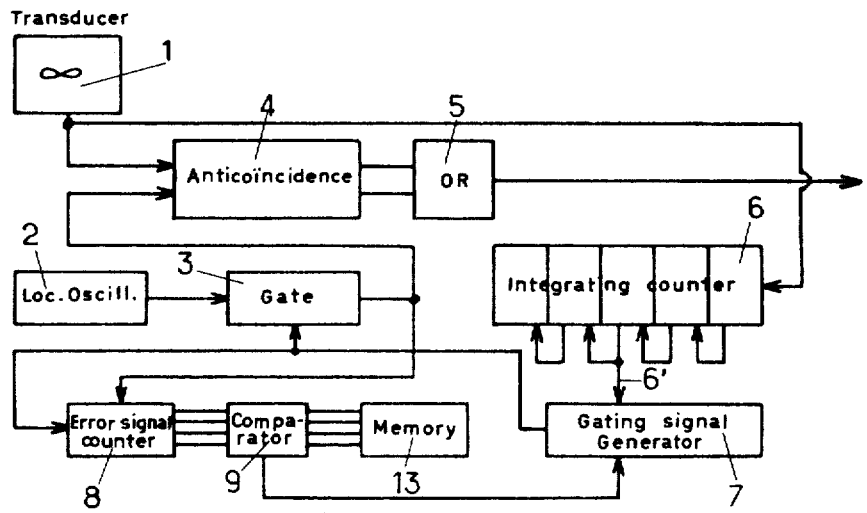
FIGURE 1 represents a compensation circuit for an error by shortage.

FIGURE 1 represents a compensation circuit for an error by shortage, i.e., for compensation of an error in the case in which the value measured is too low. 1 represents the measuring device, a flowmeter with an output signal constituted by a pulse train, the frequency of which represents the value of the output measured, to use the type of measuring device of copending application Ser. No. 441,735. It is assumed, therefore, that the calibration curve of device 1 shows that the signal frequency, at the rate of flow being considered, is lower than which would be delivered by a perfect device. The present invention provides for the reinjection into the numerical regulating circuit of the number of impulses corresponding to the absolute value of the error indicated on the calibration curve of device 1, this curve indicating, for the output considered, the error in percentage. In other words, it gives the indication of the volume to be added each time the volume corresponding to the output measured by device 1 corresponds to 100 units, so as to compensate the measuring error of 1. This volume is indicated by counter 6 which receives the impulses delivered by 1. The compensation circuit comprises a local oscillator 2, the frequency of said oscillator being selected higher than the maximal value of the frequency of the signals issued from 1, the ratio of the frequencies being of the order of magnitude of the maximal error to be compensated. However, the frequency of oscillator 2 must remain compatible with the answering speeds of the various counting elements of the circuit. Oscillator 2 feeds, through a gate circuit 3, an anti-coincidence circuit 4 which itself receives the signals delivered by device 1. The main purpose of this circuit 4 is to prevent the introduction into the output circuit of an impulse issued by 2 at an instant following too closely that of an impulse issued by 1, which might disturb the operation of the output circuit. Circuit 4 is constituted, as is well known, by a monostable circuit which delays the second impulse of a pair of impulses which are too close together, without eliminating it. An OR circuit 5 feeds the output circuit. Transducer 1 feeds directly the integrating counter 6 which is part of the compensation circuit according to the invention. Counter 6 counts permanently the signal delivered by transducer 1. It totals and indicates at each instant the flow volume. It is of the decimal type, for example, or more generally uses the same numbering system as the calibration curve. The auxiliary output 6' of this counter corresponds to the value of the volume for which compensation must be made (100 units in the example given above). Output 6' is consequently connected to counter 6 so as to deliver a signal for each hundred counted. The signal issued by 6 triggers a bistable circuit 7 which actuates the opening of gate 3 placing oscillator 2 in relation with the output circuit. The signal transmitted by 3 also feeds error counter 8, constituted of a group of binary stages, the capacity of which corresponds to the maximal value of the error to be corrected. This counter is reset by the switching of 7. Counter 8 feeds a digital comparator 9. Memory 13 in which the value of the error to be compensated is recorded, is also connected to 9. When the count indicated by 8 and the value recorded in 13 are equal, the comparator circuit 9 delivers a signal of reset of the bistable stage 7, which leads to the closing of gate 3 and the reset of counter 8. A comparator circuit is of the type described in the book entitled: "Design of Transistorized Circuits for Digital Computers," by Mr. Pressman (J. P. Rider, Publisher). Circuit 13 is of a type available commercially, sold under the trade name "multi-switch" by Contraves A. G. in Zurich, Switzerland, Shaffhauser Strasse 580. The next passage through a multiple of the value defined by connection 6' of counter 6 triggers the introduction in the circuit of a number of pulses issued by 2 and equal to that recorded in memory 13.

Figure 2:
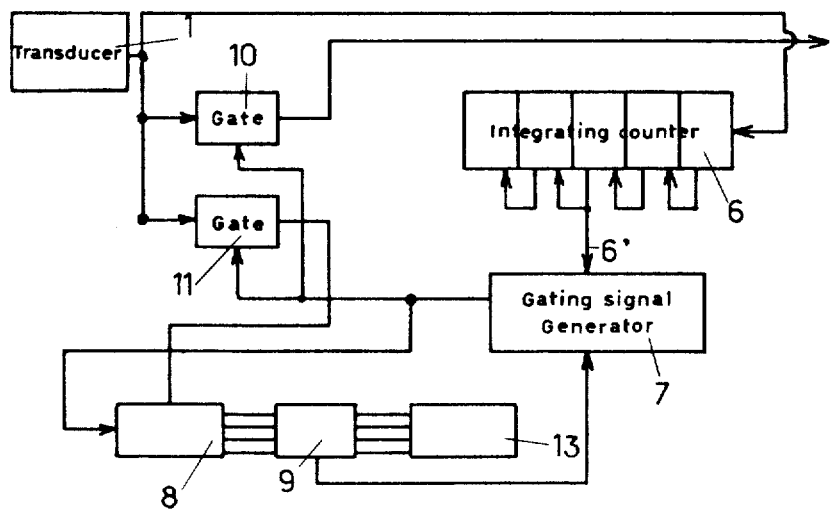
FIGURE 2 represents a compensation circuit for an error by excess.

FIGURE 2 corresponds to the case of an error by excess of the output measuring device 1, i.e., the case in which it is necessary to eliminate from the circuit a certain number of pulses delivered by 1 each time their number reaches a given value. The elements common to the circuits of FIGURES 1 and 2 have the same reference numerals. Transducer 1 feeds the ouput circuit through a gate 10 which is normally open. Counter 6 receives the signals directly from transducer 1. The passage through values which are multiples of that corresponding to the point selected on the calibration curve triggers, through connection 6', the switching of the bistable gating signal generator 7, which closes gate 10 and opens a second gate 11 parallelly connected on the first gate. The pulses delivered by device 1 are then transmitted through gate 11 to error signal counter 8, returned to zero upon opening of gate 11 by the switching of 7. As in the case of the circuit illustrated in FIGURE 1, the count appearing on 8 is compared to the absolute value of the error recorded in 13 in the digital comparator circuit 9. When the two values are equal, the signal delivered by comparator 9 returns bistable 7 to its initial state, which causes the closing of gate 11 and the reopening of gate 10.

Figure 3:
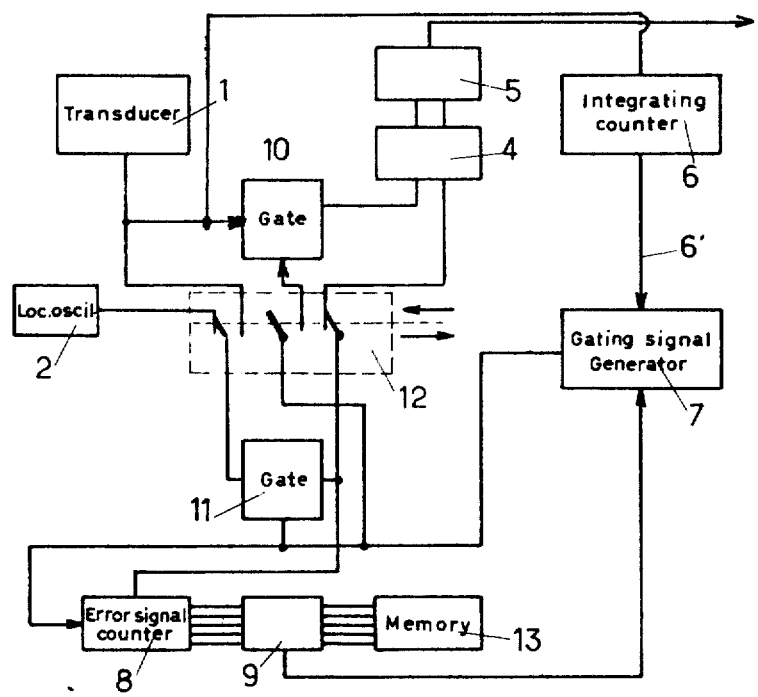
FIGURE 3 represents a compensation circuit for a single error of any sign.

FIGURE 3 shows a circuit according to the present invention which permits alternately the compensation of errors by shortage and by excess. This circuit comprises the same elements as the circuits represented in FIGURES 1 and 2 and carries the same reference numerals. A switch 12 is used as element to define the sign of the error. In the case of an error by shortage, the left contacts are closed, in the case of an error by excess, the right contacts are closed.

We have not specified how the numerical values of the errors were placed in the memory 13, nor the position of switch 12 in the case of FIGURE 3. It is well understood that these members may be actuated either manually, or automatically, in function of a program previously established or an actuating signal supplied, for example, by the integrating counter 6.

Figure 4:
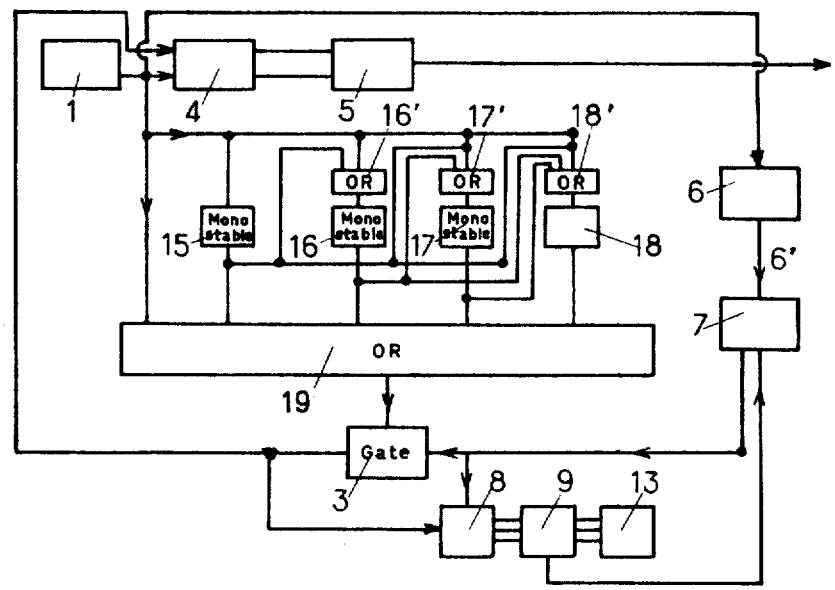
FIGURE 4 is a variation of the circuit of FIGURE 1.

The circuit shown in FIGURE 4 constitutes a variation of the circuit of FIGURE 1, which is simpler. It may also be used, of course, in the case of FIGURE 3. The variation concerns the nature of the oscillator 2 delivering the high frequency pulses which must be introduced as compensation. The example shown in FIGURE 4 uses, instead of a local oscillator 2, a pulse multiplier. The signal delivered by 1 may be used to feed said multiplier, which is constituted of a set of monostable stages 15, 16, 17 and 18 receiving the signals issued by 1 in parallel, through OR circuits 16', 17' and 18'. Each one-shot multivibrator is also coupled to any preceding stage.

The time constants of circuits 15 to 18 are decreasing and from a geometric progression by reason 1/2.

The inter-stage couplings actuate the switching of lower time constant stages, through the longer stage pulse edge. A train of 16 pulses which follows each pulse delivered by 1 is obtained at the output of the OR circuit 20. It is well understood that the number of pulses of each train, defined by the number of stages 15, 16 . . . used, is given as an illustration and is not limiting. These pulse trains are transmitted to the error counter 8 through gate 3 actuated by bistable stage 7, as in the embodiment of FIGURE 1 of the present application and to the output circuit through 4.

Figure 5:
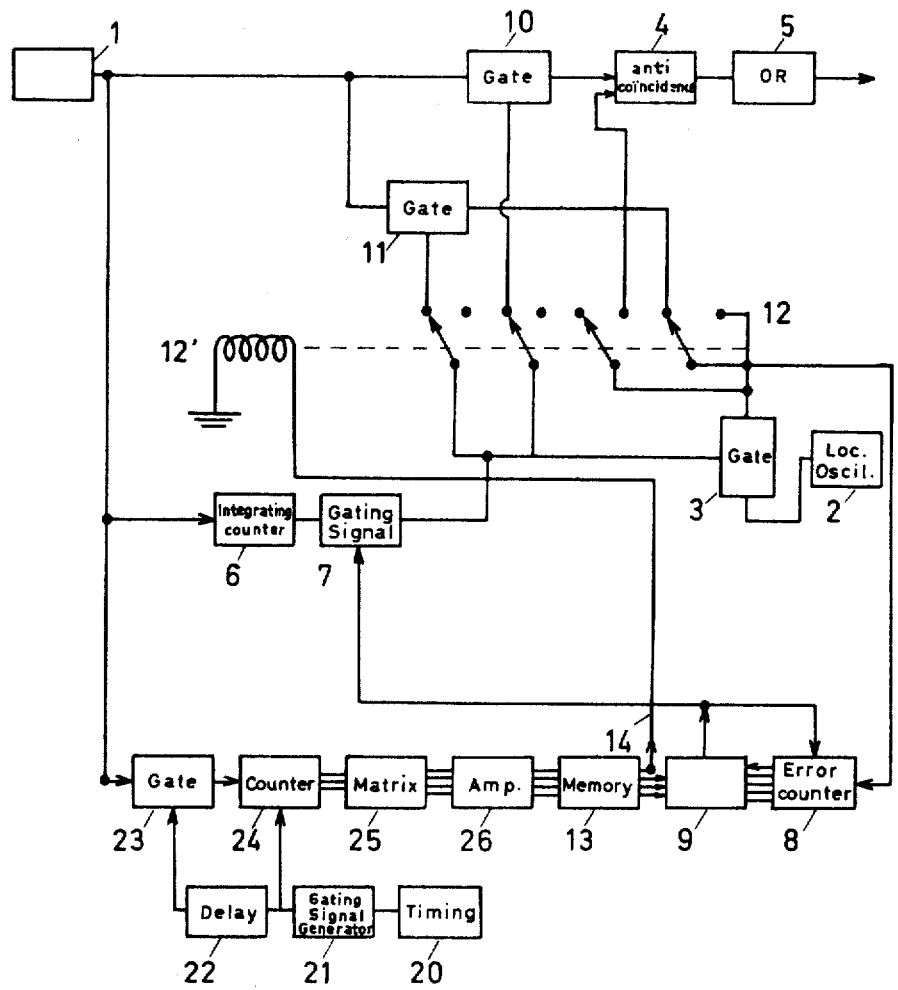

FIGURE 5 corresponds to the most general application of the compensating system according to the invention when the flow rate can vary during operation.

The same reference numbers have been used as in the previous embodiments.

The main line consists of transducer 1 feeding the automatic control system through gate 10 (NAND), anti-coincidence circuit 4 and OR circuit 5. AND circuit 11 for removing pulses in case of an excess error is connected to transducer 1 before gate 10 and through switch 12 to the error counter 8.

The signal from 1 is continuously counted in 6 (binary counter), the passage of the count through a given value (100, 1000 according to the scale of the error in the calibration curve of 1) actuates the gating signal generator 7 (control of gates 11, 10, 3 through switch 12). Switch 12 is a double pole four throw switch, controlled by coil 12'. The four contacts in the left position correspond to an excess error, the four contacts in the right position correspond to a stortage error as already mentioned with reference to FIGURE 3. The current for coil 12' is supplied by 13 which is a multi-word memory analogous to 13 of FIGURES 1 and 2, for the storage of the error (value and sign) as explained further, through line 14.

The information from transducer 1 is simultaneously supplied through AND gate 23 to a data processing unit 23 to 13 which selects the value of the error correspondto the instantaneous flow rate from memory 13. Such a unit is already described in French Patent No. 1,397,295 filed on Mar. 3, 1964 to Herbert Ernyei and assigned to Lignes Télégraphiques et Téléphoniques. Gate 23 is open for a given time period by means of timing generator 20 which controls the timing signal generator 21 (a flip-flop unit). The period of this generator is to be constant. It fixes the time during which counter 24 counts the pulses from 1 so as to obtain a value corresponding to the instantaneous value of the frequency of such pulses. The period should of course be several times the mean period of the signal from 1. It depends also on the sampling period, that is on the overall precision of the automatic control loop. The gating signal is supplied to gate 23 through a delay unit 22 and directly as a reset signal to the counter 24 so as to reset it to zero before any count. The delay from 22 is only to allow time for the counter stages to be switched by the reset signal before a new operation. The output from counter 24 is a digital series output (as many output lines as the maximum number to be counted has digits). This digital count is supplied through an interconnection matrix to memory 13. This interconnection matrix is a set of pyramidally connected unidirectional devices which will transmit an output signal to a particular output line and only to said line for each particular input coded count. Thereby the series output from counter 24 is transformed into a parallel output one signal being supplied for any given count to one of the several outputs. There are so many output lines as values stored in the memory 13 (i.e. as values given in the calibration curve). An amplifier stage 26 is connected between 25 and the memory 13. This memory is a switchboard as already mentioned. The series of contacts of this switchboard feeding output 14 stores the sign of error signal which is directly transmitted to coil 12' actuating switch 12. The position of switch 12 shown in FIGURE 5 corresponds to an excess error. Under the control of 7 gate 10 is closed (no information to the automatic control system) and gate 11 opens. Through the last contact at the right, the pulses through 11 are counted in the error signal counter 8 and compared in comparator 9 to the value in 13. When both are equal, 7 is reset, gate 11 closes and gate 10 opens.

In the other position of switch 12, the extra pulses from local oscillator 2 are introduced in the line through gate 3 opened by the gating signal generator 7 and to anti-coincidence circuit 4 through the third contact from the left. The output from 3 is also fed to error counter 8 through the last contact at the right. The output from comparator 9 resets gating signal generator 7.

An anti-coincidence circuit such as used as 4 is fully described in "Instrument and Control System," volume 33, December 1960 issue, page 2074 and entitled: "Bi-Directional Counting" by R. Hupp. Gates 3, 10 and 11 are AND circuits, for example, of the type described on p. 52 of the book entitled: "Les Techniques Binaires et le Traitement de l'Information" by Mr. Soubies-Camy Dunod, publisher). Binary counter such as 6, 8 and 24 and gating signal generators such as 7 are fully described in the book "Design of Transistorized Circuits for Digital Computers" by Pressman, published by J. P. Rider (New York). It is well understood that any other equivalent circuit may be used by one skilled in the art without departing from the scope of the present invention.

We claim:

1. A calibrated transducer constant error by excess automatic compensating system comprising:
    a transducer;
    an output circuit for said transducer;
    a logic circuit between said transducer and said output circuit;
    a pulse integrating counter;
    means connecting said transducer to said counter;
    means controlling said logic circuit according to a preset count from said counter;
    an error memory;
    an error signal counter;
    means for connecting said logic circuit to said error signal counter; and
    means for resetting said logic circuit control means comprising a comparator circuit operatively connected to said logic circuit control means and to said error memory and said error signal counter.

2. A calibrated transducer constant lack error automatic compensating system comprising:
    a transducer with digital output;
    an output circuit for said transducer to feed an automatic control system;
    means for generating compensating pulses at a frequency higher than the maximum output frequency of the pulses from said transducer;
    a logic circuit comprising a normally closed gate between said generating means and said output means;
    an integrating counter circuit;
    means for connecting said transducer to said counter;
    means for controlling said logic circuit according to a preset count value of said counter to open said normally closed gate;
    a second counter for counting the pulses transmitted through said gate;
    an error memory;
    comparator means connected to said second counter and to said error memory;
    means for resetting said control means for said logic circuit controlled by said comparator means output so as to again close said gate.

3. A calibrated transducer constant lack error automatic compensating system comprising:
    a transducer;
    means for converting the output from said transducer into a pulse train the frequency of which is representative of the transducer output;
    an output circuit for said converter to feed an automatic control system;
    means for generating compensating pulses at a frequency higher than the maximum output frequency of the pulses from said transducer;
    a logic circuit comprising a normally closed gate between said generating means and said output means;
    an integrating counter circuit;
    means for connecting said converter to said counter;
    means for controlling said logic circuit according to a preset count value of said counter to open said normally closed gate;
    a second counter for counting the pulses transmitted through said gate;
    an error memory;
    comparator means connected to said counter and to said error memory;
    means for resetting said control means for said logic circuit controlled by said comparator means output so as to again close said gate.

4. A calibrated transducer error automatic compensating system comprising:
    a transducer having a frequency modulated pulsed output;
    means for transmitting the said pulses to an automatic control circuit comprising a first normally open gate and output circuits;
    a second normally closed gate and a third gate connected to said transducer;
    a local oscillator;
    a fourth gating means between said local oscillator and said output circuits;
    an integrating counter;
    means to connect said counter to said transducer;
    a gating signal generator;
    means to connect said generator to said counter;
    means to control said first, second and fourth gates from said gating signal generator;
    means to transmit the pulses passing through said second and fourth gates to an error counter;
    means to reset said gating signal generator comprising a comparator means connected to said error counter and to an error memory;
    means for selecting the proper value in said error memory comprising said third gate;
    control means for said third gate comprising a timing generator;
    a second gating signal generator;
    a delay unit;
    a third instantaneous value counter;
    means to supply the output from said third gating means to said counter;
    a distribution matrix for selecting the value in the memory according to the value counted in said third counter;

and means to interconnect said first, second and third gates according to the selected value in said memory.

5. A calibrated transducer error automatic compensating system comprising:
- a transducer having frequency modulated pulses;
- output means for transmitting said pulses to an automatic control circuit comprising a first normally open gate and output circuits;
- a second normally closed gate;
- a third gate;
- means connecting said gates to said transducer;
- a local oscillator comprising a line of monostable generators;
- means to connect said generators to said transducer;
- a set of logic OR circuits connected between said connecting means and any of the previous monostable generators in the line;
- an output OR circuit;
- a fourth gating means between said local oscillator and said output circuits;
- an integrating counter;
- means to connect said counter to said transducer;
- a gating signal generator;
- means to connect said generator to said counter;
- means to control said first, second and fourth gates from said gating signal generator;
- means to transmit the pulses passing through said second and fourth gates to an error counter;
- means to reset said gating signal generator comprising a comparator means connected to said error counter and to an error memory;
- means for selecting the proper value in said error memory comprising said third gate;
- control means for said third gate comprising a timing generator;
- a second gating signal generator and a delay unit;
- a third instantaneous value counter;
- means to supply the output from said third gating means to said counter;
- a distribution matrix for selecting the value in the memory according to the value counted in said third counter;
- and means to interconnect said first, second and third gates according to the selected value in said memory.

6. A calibrated transducer error automatic compensating system comprising:
- a transducer;
- means for converting the output from said transducer into a pulse train the frequency of which is representative of the transducer output;
- means for transmitting said pulses to an automatic control circuit comprising a first normally open gate and output circuits; a second normally closed gate; a third gate; means connecting said second and third gates to said converter;
- a local oscillator;
- a fourth gating means between said local oscillator and said output circuits;
- an integrating counter;
- means to connect said counter to said converter;
- a gating signal generator;
- means to connect said generator to said counter;
- means to control said first, second and fourth gates from said gating signal generator;
- means to transmit the pulses passing through said second and fourth gates to an error counter;
- means to reset said gating signal generator comprising a comparator means connected to said error counter and to an error memory;
- means for selecting the proper value in said error memory comprising said third gate;
- control means for said third gate comprising a timing generator;
- a second gating signal generator and a delay unit;
- a third instantaneous value counter;
- means to supply the output from said third gating means to said counter;
- a distribution matrix for selecting the value in the memory according to the value counted in said third counter;
- and means to interconnect said first, second and third gates according to the selected value in said memory.

References Cited
UNITED STATES PATENTS

| | | | |
|---|---|---|---|
| 3,324,458 | 6/1967 | MacArthur | 340—172.5 |
| 3,229,078 | 1/1966 | Boland et al. | 340—172.5 |
| 3,158,738 | 11/1964 | Pfeiffer | 235—187 |
| 3,135,862 | 6/1964 | Bishop et al. | 235—176 |
| 2,987,704 | 6/1961 | Gimpel et al. | 340—172.5 |
| 2,636,672 | 4/1953 | Hamilton et al. | 235—61 |

GARETH D. SHAW, *Primary Examiner.*